(12) United States Patent
Alfaro (10) Patent No.: US 9,024,783 B1
(45) Date of Patent: May 5, 2015

(54) AUTO TICKET SYSTEMS FOR ALERTING LAW ENFORCEMENT PERSONNEL THAT A MOTORIST IS EXCEEDING THE SPEED LIMIT

(71) Applicant: Camilo Alfaro, Reseda, CA (US)

(72) Inventor: Camilo Alfaro, Reseda, CA (US)

(*) Notice: Subject to any disclaimer, the term of this patent is extended or adjusted under 35 U.S.C. 154(b) by 51 days.

(21) Appl. No.: 13/910,207

(22) Filed: Jun. 5, 2013

Related U.S. Application Data (63) Continuation-in-part of application No. 13/815,994, filed on Mar. 20, 2013, now abandoned.

(60) Provisional application No. 61/578,762, filed on Dec. 21, 2011.

(51) Int. Cl.
    G08B 21/00 (2006.01)
    B60Q 9/00 (2006.01)

(52) U.S. Cl.
    CPC ........................................ *B60Q 9/00* (2013.01)

(58) Field of Classification Search
    CPC .......... G07C 5/008; G07C 5/02; G08G 1/052; G06Q 40/08
    USPC ................................ 340/901, 905, 441; 701/1
    See application file for complete search history.

(56) References Cited

U.S. PATENT DOCUMENTS

| 4,007,438 A | 2/1977 | Protonantis | |
|---|---|---|---|
| 5,381,155 A | 1/1995 | Gerber | |
| 5,819,198 A * | 10/1998 | Peretz | 701/117 |
| 6,462,675 B1 * | 10/2002 | Humphrey et al. | 340/905 |
| 6,931,309 B2 * | 8/2005 | Phelan et al. | 701/1 |
| 6,985,827 B2 | 1/2006 | Phippen et al. | |
| 7,801,512 B1 * | 9/2010 | Myr | 455/414.1 |
| 8,595,034 B2 * | 11/2013 | Bauer et al. | 705/4 |
| 8,818,618 B2 * | 8/2014 | Follmer et al. | 701/33.4 |

* cited by examiner

Primary Examiner — Jeffery Hofsass
(74) Attorney, Agent, or Firm — RG Patent Consulting, LLC; Rachel Gilboy (57) ABSTRACT

A ticketing device having a computerized mechanism which works in conjunction with a vehicle speedometer and is programmed to alert law enforcement personnel and dispense a ticket if the motorist is driving over the designated speed limit. In addition, units employed by teenage drivers may be programmed to send an audible or text message to their parent or guardian's cellular telephone, with the message alerting the caregiver that their teen is engaging in reckless driving.

17 Claims, 5 Drawing Sheets

AUTO TICKET SYSTEMS FOR ALERTING LAW ENFORCEMENT PERSONNEL THAT A MOTORIST IS EXCEEDING THE SPEED LIMIT

CROSS-REFERENCE TO RELATED APPLICATION

The present application is a Continuation-in-Part (CIP) related to and claims priority from prior provisional application Ser. No. 61/578,762, filed Dec. 21, 2011, and pending non-provisional application Ser. No. 13/815,994 filed Apr. 20, 2013 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of ticketing devices and more specifically relates to ticketing devices having a computerized mechanism which works in conjunction with a vehicle speedometer and is programmed to alert law enforcement personnel and dispense a ticket if the motorist is driving over the designated speed limit.

DESCRIPTION OF THE RELATED ART

Every day, thousands of consumers across the country are involved in automobile accidents. Ranging in degree from the mild "fender benders" where those involved walk away unscathed, to serious pileups where one or more persons ends up permanently disabled or in worse case scenarios, loses their life, an automobile accident can be a traumatic, life-altering experience. Automobile accidents are so prevalent in this country, that according to recent statistics compiled by the United States Department of Transportation (USDOT), an average of 6.4 million accidents involving passenger automobiles, light trucks, freight trucks, buses and motorcycles occur every year. Of those 6.4 million accidents, an estimated 42,000 end in tragic fatalities, while nearly 3.2 million survivors of auto accidents sustain serious injury. While accidents can be a result of any number of reasons, one of the most prevalent causes of vehicle accidents is speeding. USDOT estimates that the economic cost to society of speeding-related crashes is estimated to be $28 billion per year. Last year, speeding was a contributing factor in 30 percent of all fatal crashes, and 12,628 lives were lost in speeding-related crashes.

Various attempts have been made to solve the above-mentioned problems such as those found in U.S. Pat. No. 4,007,438 to Protonantis; U.S. Pat. No. 5,381,155 to Gerber; and U.S. Pat. No. 6,985,827 to Williams et al. This art is representative of ticketing devices. None of the above inventions and patents, taken either singly or in combination, is seen to describe the invention as claimed.

Thus, a need exists for a reliable auto-ticket system having a computerized mechanism which works in conjunction with a vehicle speedometer and is programmed to alert law enforcement personnel and dispense a 'ticket' if the motorist is driving over the designated speed limit and to avoid the above-mentioned problems.

BRIEF SUMMARY OF THE INVENTION

In view of the foregoing disadvantages inherent in the known ticketing means art, the present invention provides a novel auto-ticket system. The general purpose of the present invention, which will be described subsequently in greater detail, is to provide a ticketing device having a computerized mechanism which works in conjunction with a vehicle speedometer and is programmed to alert law enforcement personnel and dispense a ticket if the motorist is driving over the designated speed limit. The features of the invention which are believed to be novel are particularly pointed out and distinctly claimed in the concluding portion of the specification.

An auto-ticket system for issuing a citation to a driver of a vehicle may generally comprise an auto-ticket assembly and a speed-information receiver unit. The auto-ticket assembly may include, a housing, a CPU, a display, a wireless communication device, a wiring module, a speaker, and a tracking unit. Further, the CPU may comprise a timer, a velocity measurer, and storage means. In the preferred embodiment of the present invention, the storage means may comprise a small hard drive. Alternatively, the storage means may comprise a memory card. The display may comprise at least one light and the light may preferably comprise an LED light. The wireless communication device may comprise a modem. The tracking unit may comprise GPS means. The auto-ticket system comprises the auto-ticket assembly and the speed information receiver unit, and the auto-ticket assembly comprises in combination the housing, the CPU, the display, the modem, the wiring module, and the GPS.

With reference now to the speed-information receiver unit which may comprise a cover, a microprocessor, a receiver, a display screen, a printer, and a power source. The microprocessor, the receiver, the display screen, and the power source are located within confines of the cover. Further, the microprocessor is in wired communication via a plurality of wires with the receiver and the display screen. The power source provides operating power to the speed-information receiver unit. When powered, the modem is in wireless communication with the receiver of the speed-information receiver unit.

In turning now the auto-ticket assembly, the housing preferably comprises a speedometer for a vehicle or in alternate embodiments may be retrofit to an existing speedometer. The CPU, the display, the modem, the wiring module, and the GPS are preferably located within confines of the housing. The CPU comprises the timer in communication with the velocity measurer, and the wiring module comprises a plurality of wires for providing wired communication to the CPU. While the vehicle is being driven by the driver, the CPU stores information relating to a relative velocity of the vehicle to a road surface on the storage means. In addition, the CPU displays the information relating to the relative velocity of the vehicle to the road surface on the display. Further, the GPS is able to track a relative location of the vehicle. It should be noted that the auto-ticket assembly is mounted in the vehicle in electrical communication with the vehicle, such that the auto-ticket assembly is powered via the vehicle.

During use, the CPU causes the information relating to the relative velocity of the vehicle to the road surface to be automatically transmitted to the speed-information receiver unit via the modem after at least one warning has been communicated to the driver of the vehicle. In one embodiment, the warning is communicated to the driver when the relative velocity of the vehicle exceeds a particular speed, and the warning may comprise either an audible signal emitted by the speaker or a pulsating light emitted by the at least one LED, or in some instances both.

Once the CPU transmits the information relating to the relative velocity of the vehicle to the road surface to the speed-information receiver unit, the information relating to the relative velocity may be displayable on the display screen of the speed-information receiver unit. Additionally, the printer is able to print the information relating to the relative velocity of the vehicle driven by the driver on paper for issuing the (informal) citation. The speed-information receiver unit is monitorable by at least one third party remotely for safety and traffic law reasons. Such third parties may include a parent or guardian of the driver, a police officer or police station, a department of motor vehicles (DMV), or a traffic monitoring agency.

The auto-ticket system for issuing citations to the driver may further comprise a kit which may include the auto-ticket assembly, the speed-information receiver unit, and a set of user instructions (calibrating information and the like may be included).

A method of using the auto-ticket system may comprise the steps of installing the auto-ticket assembly to the speedometer of the vehicle, (the device) warning the driver of the vehicle when the relative velocity exceeds a particular speed, and transmitting information of the relative velocity to the speed-information receiver unit to be monitored by at least one third party.

The present invention holds significant improvements and serves as an auto-ticket system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Auto-Ticket Systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a ticketing device and more particularly to an auto-ticket system as used to provide a ticketing device having a computerized mechanism which works in conjunction with a vehicle speedometer and is programmed to alert law enforcement personnel and dispense a ticket if the motorist is driving over the designated speed limit.

Generally speaking, the auto-ticket system comprises a specially designed monitoring device which may record the driver's speed and send this information to law enforcement officials may the motorist go well beyond the posted speed limit. This device may also be programmed specifically for use by teen drivers and thus may alert parents or caregivers, via an audible phone message or text message, that their child was engaged in unsafe behavior behind the wheel. This device may be built into newly manufactured vehicles, or configured as an aftermarket accessory offered for consumer purchase and designed to be installed in existing motor vehicles.

The auto-ticket assembly may comprise a computerized mechanism wired to the vehicle's speedometer. The auto-ticket system may work with or without GPS technology and may be programmed to accommodate both analog and digital speedometers. In either case, the auto-ticket system may feature an integrated timer mechanism that records the motorist's speed at ten minute increments, for the duration of this period, with this information recorded in the unit's storage means. The storage means may comprise a hard drive. The hard drive itself may be programmed with the Vehicle Identification Number (VIN), the date, time and, if utilizing GPS, information pertaining to the location of the speeding infraction.

The auto ticket system may preferably be programmed to automatically alert law enforcement personnel that the motorist may be traveling at speeds of 90 miles per hour or more, with a ticket automatically issued in such a case. A consideration might be that GPS or comparable radar versions of this device may also be programmed with the speed limits of roads on which the vehicle is traveling, automatically alerting law enforcement personnel if the motorists travels several miles (such as five or ten mph) above the posted speed limit. The auto ticket system may also comprise an integrated visible alarm mechanism in the form of a flashing light source that may alert the motorist that they are approaching an excessive speed. May the motorist reach the speed of 90 mph (or a speed determined by law enforcement officials to warrant a speeding ticket) the ticket itself may automatically be distributed via a small paper printer housed within the unit.

Information printed on this ticket may include the VIN, ticket number, recorded speed, exact time the infraction occurred, location and the cost of the ticket. Information may be sent wirelessly to law enforcement personnel, enabling them to record the infraction and distribute a ticket without having to first pull the motorist over in order to do so. This device may be configured without a printer; this information may be contained on a paper ticket sent to the motorist by law enforcement officials. As mentioned, in the case of underage motorists, the Auto Ticket may also be programmed to send an alert to that driver's parents or caregiver, with information pertaining to the driver's speed, location, and other pertinent data included in this message.

The auto ticket system is an innovative product concept which may offer motorists a number of significant benefits and advantages. Foremost, the auto ticket system may offer an effective tool with which to deter motorists from traveling at unsafe speeds. A computerized mechanism is wired to the vehicle's speedometer and programmed to distribute a speeding ticket may a driver travel at a speed beyond the designated speed limit, the auto ticket system may provide a tangible reminder to the motorist to drive within the appropriate speed limit and follow the rules of the road.

As such, the auto ticket system may effectively reduce the amount of collisions and automobile accidents that occur on a daily basis as a result of speeding drivers. With information wirelessly sent to law enforcement personnel and tickets distributed automatically, the auto ticket system may also spare law enforcement personnel the task of pulling over speeding drivers, thus preventing the hazards that these officers face when standing on the side of a busy highway in order to ticket a motorist. Further, by automatically distributing a ticket to the motorist, use of this product may free up the law enforcement personnel's time to focus on more vital issues of public safety.

Parents of underage and teenage drivers may especially appreciate that with the auto ticket system installed in their vehicle; they may monitor their child's driving habits and may be quickly alerted if their child was engaged in unsafe behavior behind the wheel. Importantly, by deterring speeding and thus reducing the accidents and injuries that often result, installation of the Auto Ticket may also result in lower insurance premiums, saving the motorist money. Encouraging safe driver conduct, the auto ticket system may prove an invaluable safety tool in any car or light truck.

The auto ticket system provides vehicle operators a simple means of monitoring their speed, as well as encouraging safe conduct on the road. Automatically distributing a ticket may the motorist drive beyond the designated speed limit, this unique mechanism may prove an invaluable safety tool in any vehicle.

Referring to the drawings by numerals of reference there is shown in FIGS. 1-5, perspective views illustrating auto-ticket systems 100 according to an embodiment of the present invention. In one embodiment of the present invention, auto-ticket systems 100 may generally comprise auto-ticket assembly 102 and speed-information receiver unit 300. Auto-ticket assembly 102 may comprise housing 115, CPU 110 having timer 228, velocity measurer 230, and storage means 232. Auto-ticket assembly 102 may further comprise display 205, wireless communication device 210, wiring module 215, and tracking unit 220. Auto-ticket systems 100 comprising speed-information receiver unit 300 may comprise cover 302, microprocessor 305, receiver 310, display screen 315, and power source 320.

Figure 1:
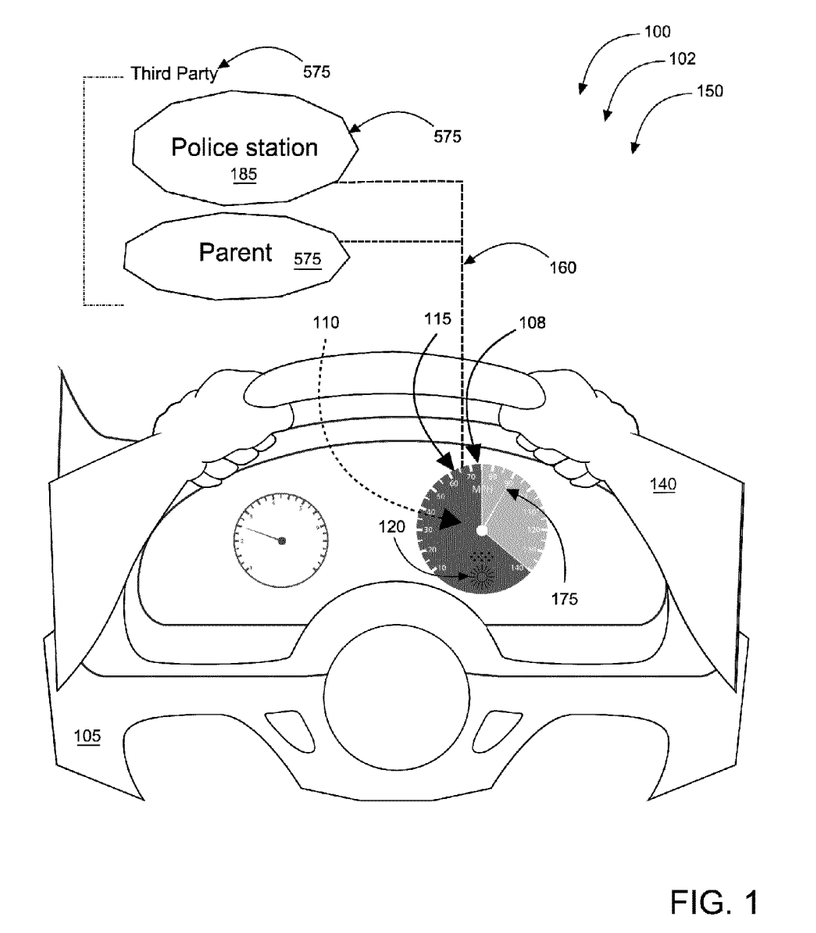
FIG. 1 shows a perspective view illustrating an auto-ticket system comprising an auto-ticket assembly in communication with a vehicle's speedometer according to an embodiment of the present invention.

Referring now more specifically to FIG. 1, showing CPU 110 of auto-ticket assembly 102 which may be installed in housing 115 comprising speedometer 108 of vehicle 105. Generally, auto-ticket systems 100 may comprise auto-ticket assembly 102 and speed information receiver unit 300. Auto-ticket assembly 102 may comprise in combination housing 115, CPU 110, display 205, wireless communication device 210, wiring module 215, and tracking unit 220. Speed-information receiver unit 300 may comprise in combination cover 302, microprocessor 305, receiver 310, display screen 315, and power source 320. As may be seen in FIG. 1, CPU 110, display 205, wireless communication device 210, wiring module 215, and tracking unit 220 are located within confines of housing 115. It should be noted that auto-ticket assembly 102 is mounted in vehicle 105 in electrical communication with vehicle 105, such that auto-ticket assembly 102 is powered via vehicle 105. Other retro-fit versions may be used or OEM models may be produced.

In continuing to refer to FIG. 1, wireless communication device 210 of auto-ticket assembly 102 may transmit wireless signal 160 relating to at least one driving activity of driver 140 of vehicle 105 to third party 575. In one embodiment, third party 575 may comprise police station 185, as shown in FIG. 1. In alternative embodiments, third party 575 may comprise a parent or guardian of driver 140, Department of Motor Vehicles (DMV), or other party with an interest in monitoring the driving activity of driver 140. Third party 575 is able to be in communication with the present invention via internet or the like. Communication is indicated using dashed lines.

In continuing to refer to FIG. 1, it may be further appreciated that housing 115 of auto-ticket assembly 102 may comprise light 120. In one embodiment, light 120 may comprise at least one LED light. Light 120 comprising LED light may be beneficial in providing a visual indication to driver 140 that relative velocity 175 of vehicle 105 during 'in-use' condition 150 may be in excess of a local speed limit. In such a manner, light 120 may serve as a warning to driver 140.

Figure 2:
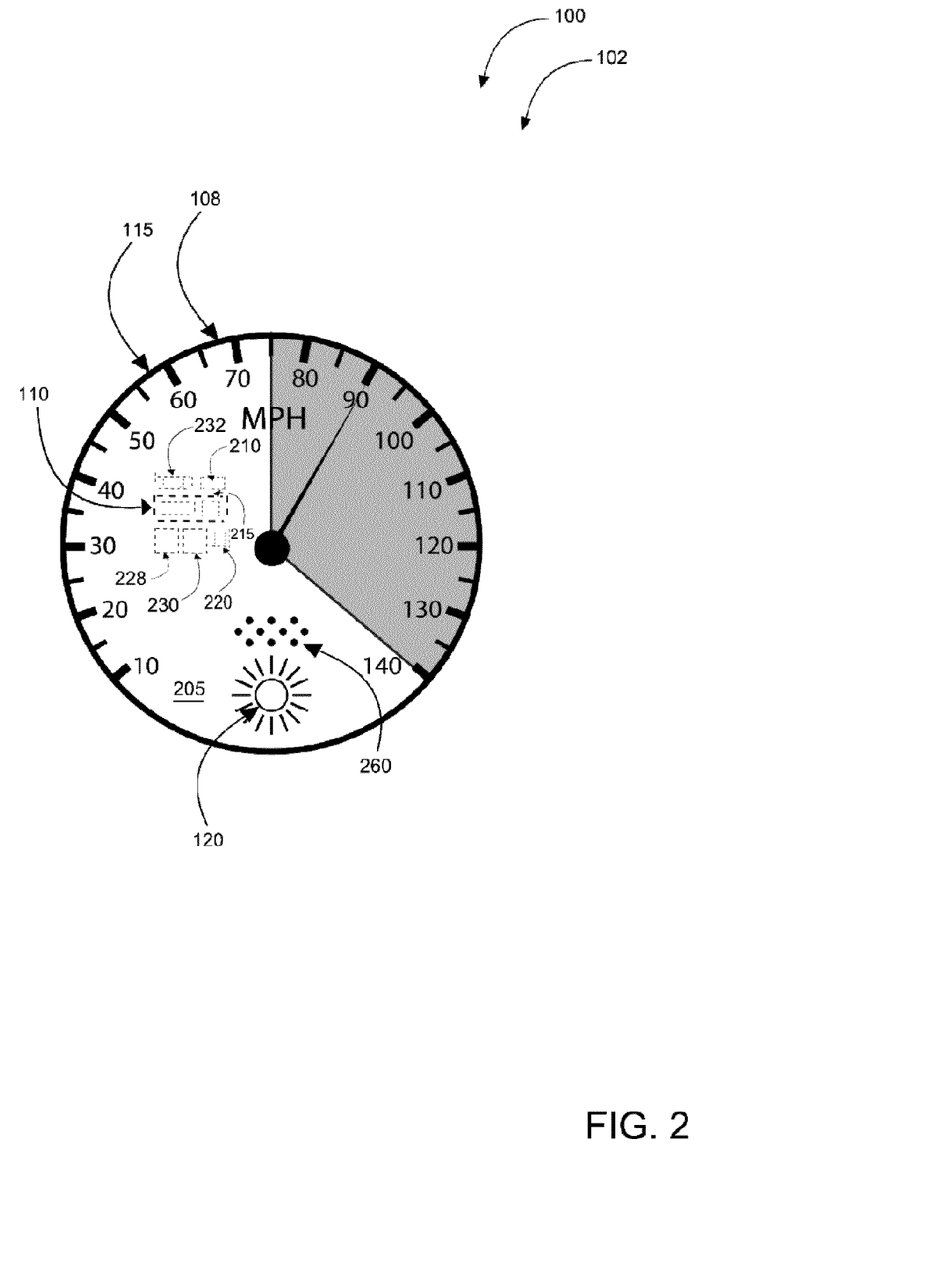
FIG. 2 is a perspective view illustrating the auto-ticket assembly according to an embodiment of the present invention of FIG. 1.

Referring now to FIG. 2 showing a perspective view illustrating auto-ticket assembly 102 according to an embodiment of the present invention of FIG. 1. As shown, CPU 110 of auto-ticket assembly 102 may comprise timer 228 in communication with velocity measurer 230. Further, wiring module 215 may comprise a plurality of wires for providing wired communication to CPU 110. CPU 110 may information 325 relating to relative velocity 175 of vehicle 105 to a road surface on storage means 232. In addition, CPU 110 is able to display information 325 relating to relative velocity 175 of vehicle 105 to the road surface on display 205.

In continuing to refer to FIG. 2, timer 228 of CPU 110 of auto-ticket assembly 102 may comprise an analog or digital timing device which may be able to keep track of an amount of time in which vehicle 105 is being driven at an excessive speed by driver 140. Timer 228 may be able to display the time of excessive speed on display 205. Velocity measurer 230 of CPU 110 may comprise a velocity measuring device to measure relative velocity 175 of vehicle 105. Further, velocity measurer 230 may display relative velocity 175 of vehicle 105 on display 205. In one embodiment of the present invention, storage means 232 of CPU 110 may comprise a hard drive. CPU 110 may record data generated by timer 228 and velocity measurer 230 on storage means 232 comprising the hard drive. In alternative embodiments, storage means 232 may comprise a memory card, a USB, or other writable medium. Furthermore, CPU 110 may cause information 325 relating to relative velocity 175 of vehicle 105 to the road surface to be automatically transmitted to third party 575 via wireless communication device 210 after at least one warning has been communicated to driver 140 of vehicle 105, the warning communicated to driver 140 when relative velocity 175 of vehicle 105 exceeds a particular speed.

In still referring to FIG. 2, wireless communication device 210 of auto-ticket assembly 102 of auto-ticket systems 100 may comprise device for transmitting wireless signal 160 to receiver 310 of speed-information receiver unit 300 operated and managed by third party 575. In one embodiment of the present invention, wireless communication device 210 may comprise a transmitter. The transmitter may transmit wireless signal 160 which may be received by receiver 310. In another embodiment, wireless communication device 210 may comprise a modem.

With reference now to tracking unit 220 of auto-ticket assembly 102, it should be appreciated that tracking unit 220 may determine a location of vehicle 105 when vehicle 150 is 'in-use' condition 150. In one embodiment of the present invention, tracking unit 220 may comprise GPS. Preferably, tracking unit 220 comprising GPS is in communication with at least one server maintained by a local municipality for determining a particular speed comprising a local speed limit. In other embodiments, tracking unit 220 may comprise satellite or non-satellite tracking technology. The location of vehicle 105 may further be displayed on display 205 or transmitted via wireless signal 160 to speed-information receiver unit 300.

In one embodiment of the present invention as shown in FIGS. 1 and 2, auto-ticket assembly 102 of auto-ticket systems 100 may further comprise speaker 260. CPU 110 may be in communication with speaker 260 via wiring module 215 and may control an audible signal to be emitted by speaker 260 to indicate a warning to driver 140 of vehicle 105.

With particular regard to the warning issued by auto-ticket assembly 102, in one embodiment the warning may comprise a pulsating light emitted by light 120. In such a manner, when driver 140 exceeds the particular speed, light 120 may pulsate to indicate a danger of receiving a traffic infraction. In another embodiment, CPU 110 of auto-ticket assembly 102 may cause speaker 260 to emit the audible signal to indicate to driver 140 the danger of receiving a traffic infraction. In one embodiment of the present invention, CPU 110 may automatically transmit information 325 relating to relative velocity 175 of vehicle 105 to speed-information receiver unit 300 once 5 warnings have been issued.

Figure 3:
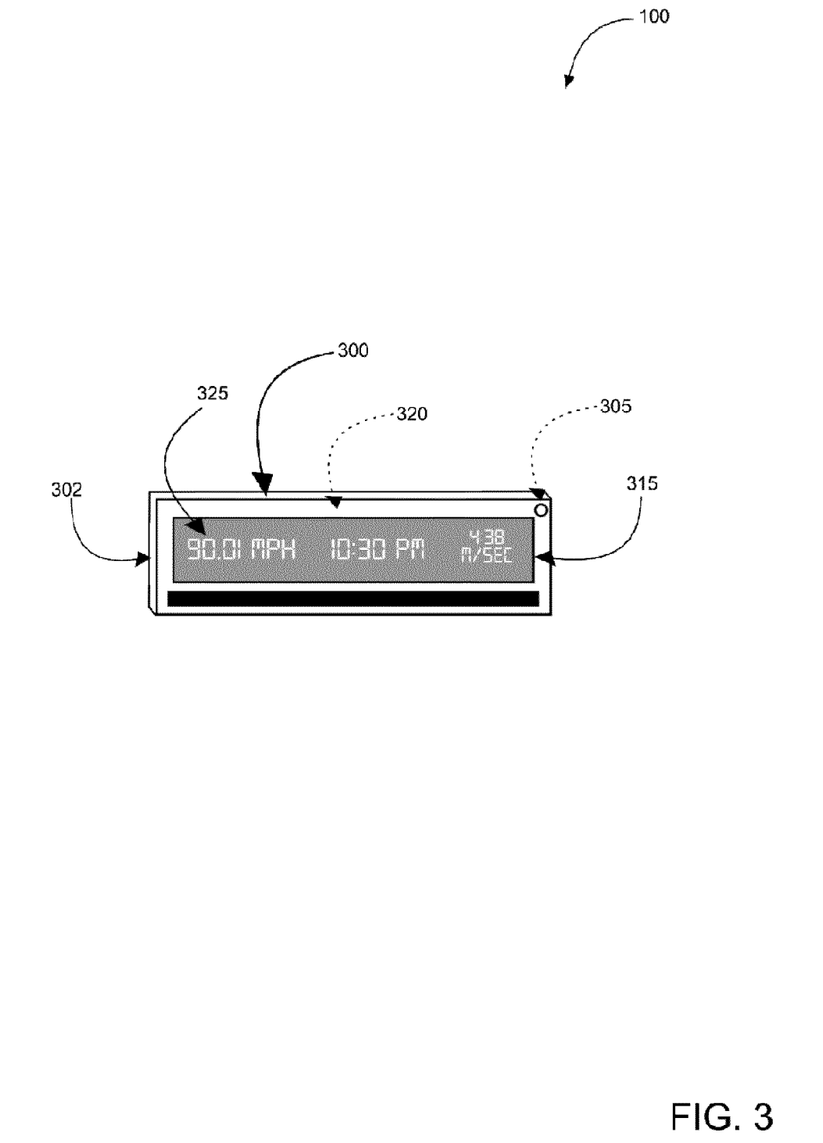
FIG. 3 is a perspective view illustrating a speed-information receiver unit according to an embodiment of the present invention of FIG. 1.

Referring now to FIG. 3 showing a perspective view illustrating speed-information receiver unit 300 of auto-ticket systems 100 according to an embodiment of the present invention of FIG. 1.

Speed-information receiver unit 300 may comprise cover 302, microprocessor 305, receiver 310, display screen 315, and power source 320. As shown, microprocessor 305, receiver 310, display screen 315, and power source 320 are located within confines of cover 302. Microprocessor 305 may be in wired communication via a plurality of wires with receiver 310 and display screen 315, and power source 320 may provide operating power to speed-information receiver unit 300. It should be noted that wireless communication device 210 of CPU 110 of auto-ticket assembly 102 is in wireless communication with receiver 310 of speed-information receiver unit 300.

In an embodiment of the present invention, information 325 may include the VIN, ticket number, recorded speed, exact time the infraction occurred, location and the cost of the ticket. Information 325 may be sent wirelessly to law enforcement personnel, enabling them to record the infraction and distribute a ticket without having to first pull driver 140 over in order to do so. The ticket may also comprise a warning ticket.

Figures 4A, 4B, 4C:
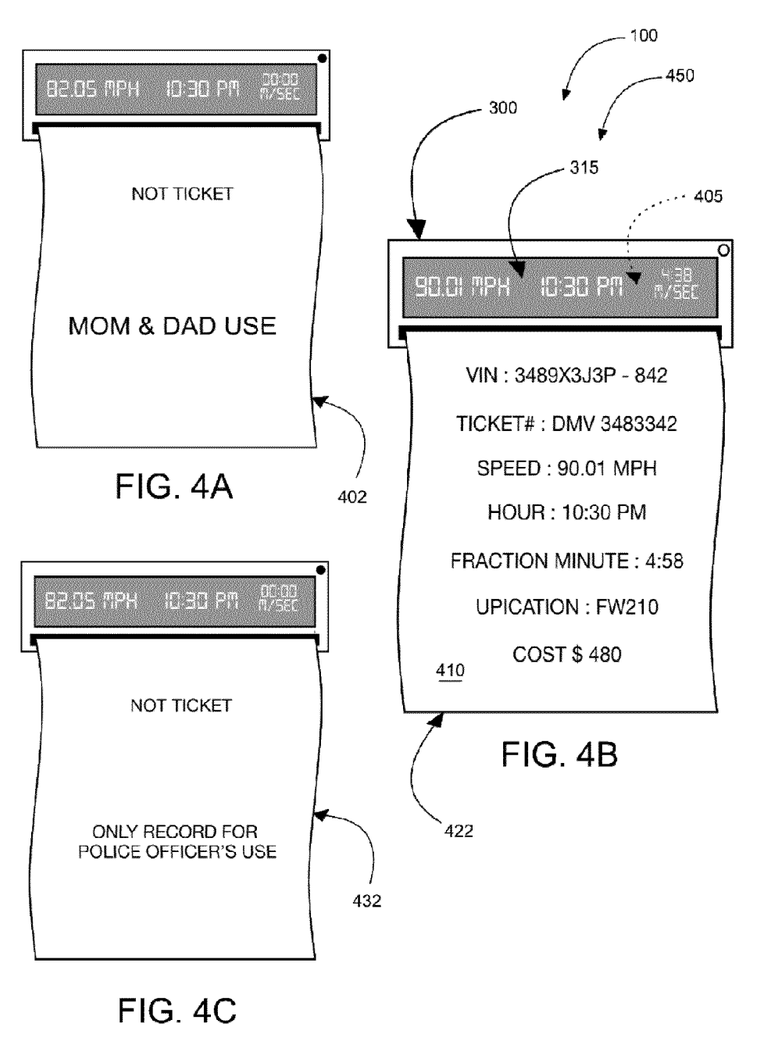
FIG. 4A is a perspective view illustrating the speed-information receiver unit printing a 'father/mother' ticket according to an embodiment of the present invention of FIG. 1.
FIG. 4B is a perspective view illustrating the speed-information receiver unit printing out a DMV ticket according to an embodiment of the present invention of FIG. 1.
FIG. 4C is a perspective view illustrating the speed-information receiver unit printing a non-ticket according to an embodiment of the present invention of FIG. 1.

Referring now to FIG. 4A showing a perspective view illustrating speed-information receiver unit 300 during 'in-use' condition 450 printing 'father/mother' ticket 402 according to an embodiment of the present invention of FIG. 1. In the embodiment shown in FIG. 4A, speed-information receiver unit 300 may be maintained and operated by parent or guardian of driver 140 being a younger-aged motorist. Speed-information receiver unit 300 may comprise printer 405 for printing a notification. Preferably, printer 405 may print the notification on paper 410 which may be housed within cover 302 of speed-information receiver unit 300. It should be noted that the notification printed by printer 405 may comprise information 325 pertaining to relative velocity 175, location, and other pertinent data of vehicle 105 collected by CPU 110 of auto-ticket assembly 102.

Referring now to FIG. 4B showing a perspective view speed-information receiver unit 300 during 'in-use' condition 450 printing out DMV ticket 422 according to an alternative embodiment of the present invention of FIG. 1. In the embodiment shown in FIG. 4B, speed-information receiver unit 300 may be maintained and operated by a local department of motor vehicle (DMV). Further, printer 405 may print on paper 410 comprising DMV ticket 422. In one embodiment, DMV ticket 422 may comprise a speeding ticket. The speeding ticket may comprise information 325 pertaining to relative velocity 175, location, and other pertinent data of vehicle 105 collected by CPU 110 of auto-ticket assembly 102.

Referring now to FIG. 4C showing a perspective view illustrating speed-information receiver unit 300 during 'in-use' condition 450 printing out non-ticket 432 according to an embodiment of the present invention of FIG. 1. In the embodiment shown in FIG. 4B, speed-information receiver unit 300 may be maintained and operated by third party 575 comprising a police station, a traffic enforcement agency, or other interested party. Printer 405 may print non-ticket 432 on paper 410. Non-ticket 432 may comprise information 325 pertaining to relative velocity 175, location, and other pertinent data of vehicle 105 collected by CPU 110 of auto-ticket assembly 102.

In one embodiment of the present invention which may be called "complete performance", auto-ticket systems 100 may be divided into three major phases of speed enforcement service. In a first phase, non-ticket 432 may be activated reaching 70 miles per hour activating an arrow indicator of speedometer 108 and recording to storage means 232 the maximum speed reached by 10 minutes because of the time of the arrow indicator will return to the initial position. In a second phase, when vehicle 105 reaches 80 miles per hour, tracking unit 220 comprising GPS may be automatically activated allowing a satellite of GPS to realize location and time of vehicle 105. In a third phase, when vehicle 105 reaches 90 miles per hour light 120 comprising a warning light may pulsate and speaker 260 may be activated after 5 seconds of vehicle 105 having passed the limit of 90 miles per hour.

In a preferred embodiment of the present invention, auto-ticket systems 100 for issuing DMV ticket 422 to driver 140 of vehicle 105 may generally comprise auto-ticket assembly 102 and speed-information receiver unit 300. Auto-ticket assembly 102 may include housing 115, CPU 110, display 205, wireless communication device 210, wiring module 215, speaker 260, and tracking unit 220. Further, CPU 110 may comprise timer 228, velocity measurer 230, and storage means 232. In the preferred embodiment, the storage means comprises a small hard drive. Display 205 may comprise light 120 comprising a LED light. Wireless communication device 210 may comprise a modem. Tracking unit 220 may comprise GPS. Auto-ticket systems 100 comprises in combination auto-ticket assembly 102 and speed-information receiver unit 300, and auto-ticket assembly 102 comprises in combination housing 115, CPU 110, display 205, light 120, wireless communication device 210 comprising the modem, wiring module 215, tracking unit 220 comprising GPS, and speaker 260.

With reference now to speed-information receiver unit 300 which may comprise cover 302, microprocessor 305 receiver 310, display screen 315, printer 405, and power source 320. Microprocessor 305 receiver 310, display screen 315, printer 405, and power source 320 are located within confines of cover 302. Further, microprocessor 305 is in wired communication via a plurality of wires with receiver 310, display screen 315, and printer 405. Power source 320 may provide operating power to speed-information receiver unit 300. When powered, the modem of auto-ticket assembly 102 is in wireless communication with receiver 310 of speed-information receiver unit 300.

In turning now auto-ticket assembly 102, housing 115 preferably comprises speedometer 108 for vehicle 105. CPU 110, display 205, the modem, wiring module 215, and the GPS are preferably located within confines of housing 115.

CPU 110 comprises timer 228 in communication with velocity measurer 230, and wiring module 215 comprises a plurality of wires for providing wired communication to CPU 110. While vehicle 105 is being driven by driver 140, CPU 110 stores information 325 relating to relative velocity 175 of vehicle 105 to a road surface on storage means 232. In addition, CPU 110 displays information 325 relating to relative velocity 175 of vehicle 105 to the road surface on display 205. Further, the GPS tracks a location of vehicle 105. It should be noted that auto-ticket assembly 102 is mounted in vehicle 105 in electrical communication with vehicle 105, such that auto-ticket assembly 102 is powered via vehicle 105.

During use, CPU 110 may cause information 325 to be automatically transmitted to speed-information receiver unit 300 via the modem after at least one warning has been communicated to driver 140 of vehicle 105. In one embodiment, the warning is communicated to driver 140 when relative velocity 175 of vehicle 105 exceeds a particular speed, and the warning may comprise either an audible signal emitted by speaker 260 or a pulsating light emitted by light 120, or in some instances both. The present invention may comprise means whereby individuals driving may be dissuaded from tampering with the device and a warning may be issued to parents (third party 575) or the like.

Once CPU 110 transmits information 325 relating to relative velocity 175 of vehicle 105 to the road surface to speed-information receiver unit 300, information 325 may be displayable on display screen 315 of speed-information receiver unit 300. Additionally, printer 405 is able to print information 325 relating to relative velocity 175 of vehicle 105 driven by driver 140 on paper 410 for issuing the citation. Speed-information receiver unit 300 is monitorable by third party 575 remotely for safety and traffic law reasons. Third party 575 may include, but is not limited to, a parent or guardian of the driver, a police officer or police station, a department of motor vehicles (DMV), or a traffic monitoring agency.

In referring to FIGS. 1-4C, auto-ticket systems 100 for issuing a citation to driver 140 may comprise a kit. In one embodiment, the kit may include auto-ticket assembly 102, speed-information receiver unit 300, and a set of user instructions.

Figure 5:
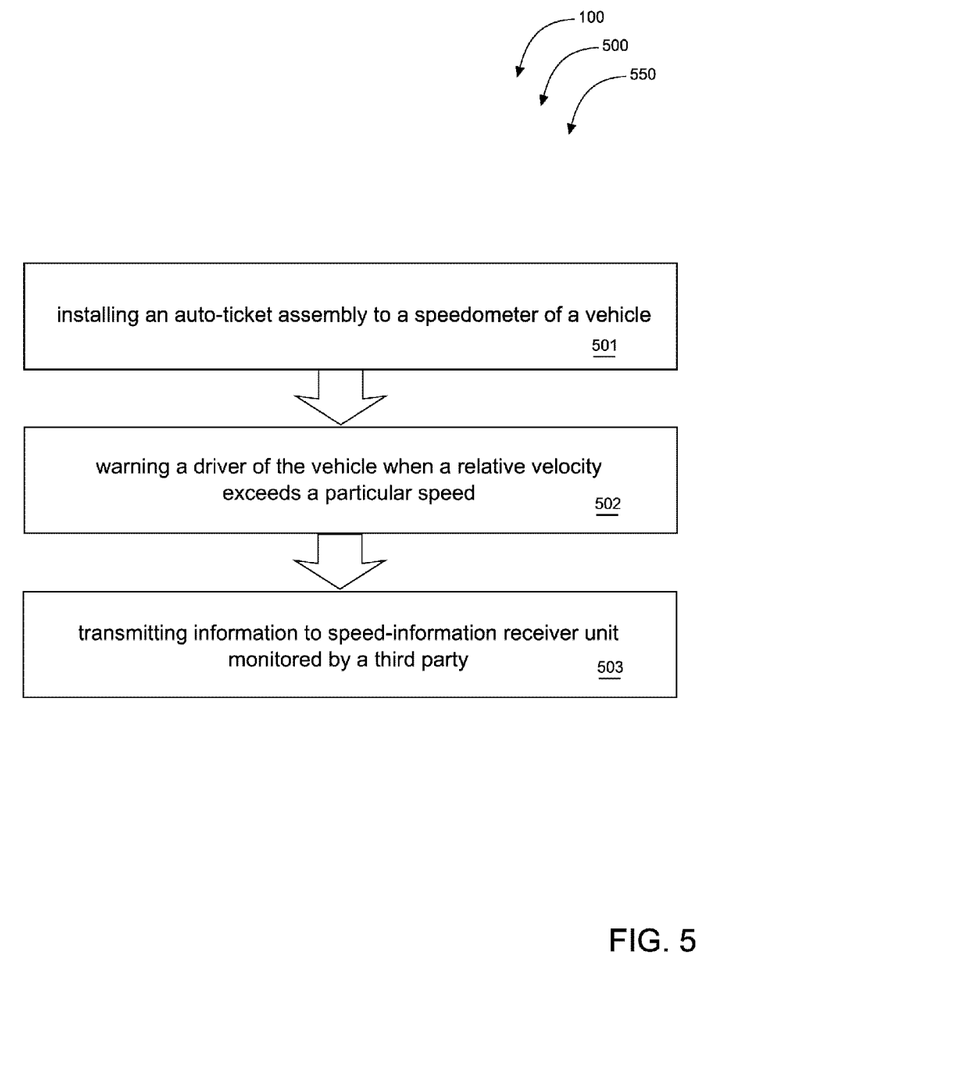
FIG. 5 is a flowchart illustrating a method of using the auto-ticket system according to an embodiment of the present invention of FIG. 1.

Referring now to FIG. 5 illustrating flowchart 550 showing method of use 500 of auto-ticket systems 100 according to an embodiment of the present invention of FIG. 1. Method of use 500 for auto-ticket systems 100 may comprise the steps of: step one 501, installing auto-ticket assembly 102 to speedometer 108 of vehicle 105, step two 502, warning driver 140 of vehicle 105 when relative velocity 175 exceeds a particular speed, and step three 503, transmitting information 325 of relative velocity 175 to speed-information receiver unit 300 monitored by third party 575.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An auto-ticket system comprising:
    a) an auto-ticket assembly including;
        i) a housing;
        ii) a CPU having;
            (1) a timer;
            (2) a velocity measurer; and
            (3) a storage means;
        iii) a display;
        iv) a speaker;
        v) a wireless communication device;
        vi) a wiring module;
        vii) a tracking unit; and
    b) a speed-information receiver unit comprising;
        i) a cover;
        ii) a microprocessor;
        iii) a receiver;
        iv) a display screen; and
        v) a power source;
    c) wherein said auto-ticket system comprises said auto-ticket assembly and said speed-information receiver unit;
    d) wherein said auto-ticket assembly comprises in combination said housing, said CPU, said display, said speaker, said wireless communication device, said wiring module, and said tracking unit;
    e) wherein said speed-information receiver unit comprises in combination said cover, said microprocessor, said receiver, said display screen, and said power source;
    f) wherein said housing comprises a speedometer for a vehicle;

g) wherein said CPU, said display, said wireless communication device, said wiring module, and said tracking unit are located within confines of said housing;
h) wherein said CPU comprises said timer in communication with said velocity measurer;
i) wherein said wiring module comprises a plurality of wires for providing wired communication to said CPU;
j) wherein said CPU stores information relating to a relative velocity of said vehicle to a road surface on said storage means;
k) wherein said CPU displays said information relating to said relative velocity of said vehicle to said road surface on said display;
l) wherein said tracking unit tracks a location of said vehicle;
m) wherein said auto-ticket assembly is mounted in said vehicle in electrical communication with said vehicle, such that said auto-ticket assembly is powered via said vehicle;
n) wherein said microprocessor, said receiver, said display screen, and said power source are located within confines of said cover;
o) wherein said microprocessor is in wired communication via a plurality of wires with said receiver and said display screen;
p) wherein said power source provides operating power to said speed-information receiver unit;
q) wherein said wireless communication device of said CPU of said auto-ticket assembly is in wireless communication with said receiver of said speed-information receiver unit;
r) wherein said CPU is able to transmit said information relating to said relative velocity of said vehicle to said road surface to said speed-information receiver unit;
s) wherein said information relating to said relative velocity is communicated to said speaker;
t) wherein said information relating to said relative velocity is displayable on said display screen;
u) wherein said speed-information receiver unit is monitorable by at least one third party remotely for safety and obedience to traffic laws; and
v) wherein said CPU is structured and arranged with said wireless communication device and said speaker and said display to automatically transmit to said third party said information relating to said relative velocity of said vehicle to said speed-information receiver unit—only after five different times said warnings have been communicated to said driver that said CPU measured said information relating to said relative velocity exceeding said particular speed, and said warnings have been communicated when said relative velocity of said vehicle exceeds said particular speed for each of said five different times.

2. The auto-ticket system of claim 1 wherein said display of said auto-ticket assembly comprises at least one light.

3. The auto-ticket system of claim 2 wherein said at least one light comprises a LED light.

4. The auto-ticket system of claim 3 wherein said tracking unit of said auto-ticket assembly comprises GPS.

5. The auto-ticket system of claim 4 wherein said GPS is in communication with at least one server maintained by a local municipality for determining said particular speed comprising a local speed limit.

6. The auto-ticket system of claim 5 wherein said CPU causes said LED light to pulsate to indicate said warning to said driver of said vehicle.

7. The auto-ticket system of claim 6 wherein said CPU is in communication with said speaker via said wiring module and controls an audible signal to be emitted by said speaker to indicate said warning to said driver of said vehicle.

8. The auto-ticket system of claim 7 wherein said wireless communication device comprises a transmitter.

9. The auto-ticket system of claim 7 wherein said wireless communication device comprises a modem.

10. The auto-ticket system of claim 1 wherein said speed-information receiver unit comprises a printer.

11. The auto-ticket system of claim 10 wherein said printer is able to print said information relating to said relative velocity of said vehicle driven by said driver on paper.

12. The auto-ticket system of claim 1 wherein said at least one third party comprises a parent.

13. The auto-ticket system of claim 1 wherein said at least one third party comprises a DMV.

14. The auto-ticket system of claim 1 wherein said at least one third party comprises a police officer.

15. An auto-ticket system for issuing a citation to a driver comprising:
  a) an auto-ticket assembly including;
    i) a housing;
    ii) a CPU having;
      (1) a timer;
      (2) a velocity measurer; and
      (3) a storage means;
    iii) a display, said display comprising at least one light, said at least one light
    iv) comprising a LED light;
    v) a wireless communication device, said wireless communication device
    vi) comprising a modem;
    vii) a wiring module;
    viii) a speaker; and
    ix) a tracking unit, said tracking unit comprising GPS; and
  b) a speed-information receiver unit comprising;
    i) a cover;
    ii) a microprocessor;
    iii) a receiver;
    iv) a display screen;
    v) a printer; and
    vi) a power source;
  c) wherein said auto-ticket system comprises said auto-ticket assembly and said speed information receiver unit;
  d) wherein said auto-ticket assembly comprises in combination said housing, said CPU, said display, said modem, said wiring module, and said GPS;
  e) wherein said speed-information receiver unit comprises in combination said cover, said microprocessor, said receiver, said display screen, and said power source;
  f) wherein said housing comprises a speedometer for a vehicle;
  g) wherein said CPU, said display, said modem, said wiring module, and said GPS are located within confines of said housing;
  h) wherein said CPU comprises said timer in communication with said velocity measurer;
  i) wherein said wiring module comprises a plurality of wires for providing wired communication to said CPU;
  j) wherein said CPU stores information relating to a relative velocity of said vehicle to a road surface on said storage means;

k) wherein said CPU displays said information relating to said relative velocity of said vehicle to said road surface on said display;
l) wherein said GPS tracks a location of said vehicle;
m) wherein said auto-ticket assembly is mounted in said vehicle in electrical communication with said vehicle, such that said auto-ticket assembly is powered via said vehicle;
n) wherein said CPU causes said information relating to said relative velocity of said vehicle to said road surface to be automatically transmitted to said speed-information receiver unit via said modem after at least one warning has been communicated to said driver of said vehicle;
o) wherein said warning is communicated to said driver when said relative velocity of said vehicle exceeds a particular speed, said warning comprising either an audible signal emitted by said speaker or a pulsating light emitted by said at least one LED, or both;
p) wherein said microprocessor, said receiver, said display screen, and said power source are located within confines of said cover;
q) wherein said microprocessor is in wired communication via a plurality of wires with said receiver and said display screen;
r) wherein said power source provides operating power to said speed-information receiver unit;
s) wherein said modem is in wireless communication with said receiver of said speed-information receiver unit;
t) wherein said CPU transmits said information relating to said relative velocity of said vehicle to said road surface to said speed-information receiver unit;
u) wherein said information relating to said relative velocity is displayable on said display screen;
v) wherein said CPU is structured and arranged with said wireless communication device and said speaker and said display to automatically transmit to said third party said information relating to said relative velocity of said vehicle to said speed-information receiver unit—only after five different times said warnings have been communicated to said driver that said CPU measured said information relating to said relative velocity exceeding said particular speed, and said warnings have been communicated when said relative velocity of said vehicle exceeds said particular speed for each of said five different times;
w) wherein said printer is able to print said information relating to said relative velocity of said vehicle driven by said driver on paper for issuing said citation; and
x) wherein said speed-information receiver unit is monitorable by at least one third party remotely for safety and traffic law reasons.

16. The auto-ticket system for issuing said citation to said driver of claim 15 further comprising a kit including:
   a) said auto-ticket assembly;
   b) said speed-information receiver unit; and
   c) a set of user instructions.

17. A method of using the auto-ticket system for issuing said citation to said driver of claim 15 comprising the steps of:
   a) installing an auto-ticket assembly to a speedometer of a vehicle;
   b) warning a driver of said vehicle when a relative velocity exceeds a particular speed; and
   c) transmitting information of said relative velocity to a speed-information receiver unit monitored by at least one third party.

\* \* \* \* \*